Jan. 20, 1970    B. PEIREZ ET AL    3,490,837
PROJECTOR WITH FILM THREADING MEANS
Filed June 8, 1967    3 Sheets-Sheet 2

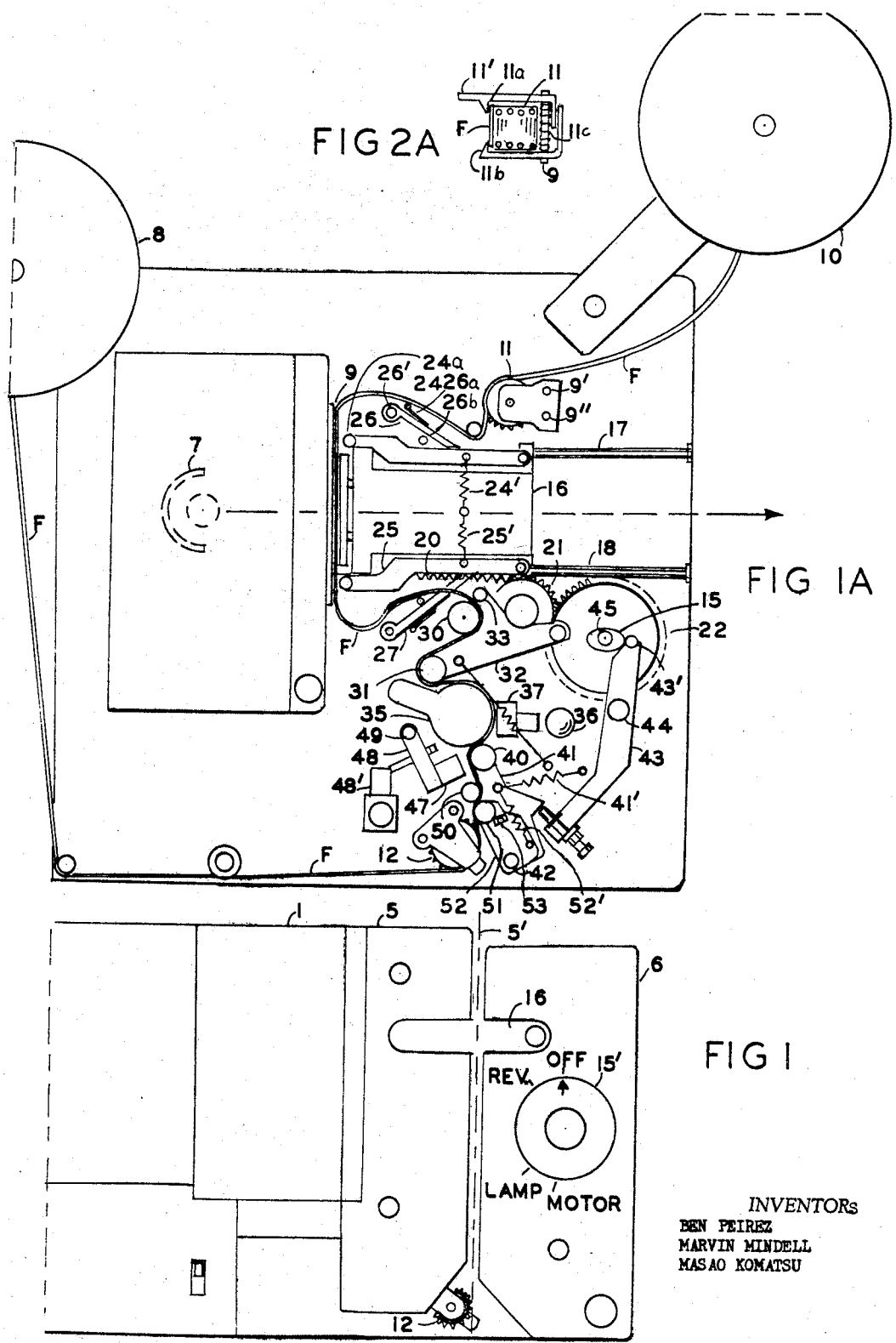

INVENTORs
Ben Peirez
Marvin Mindell
Masao Komatsu

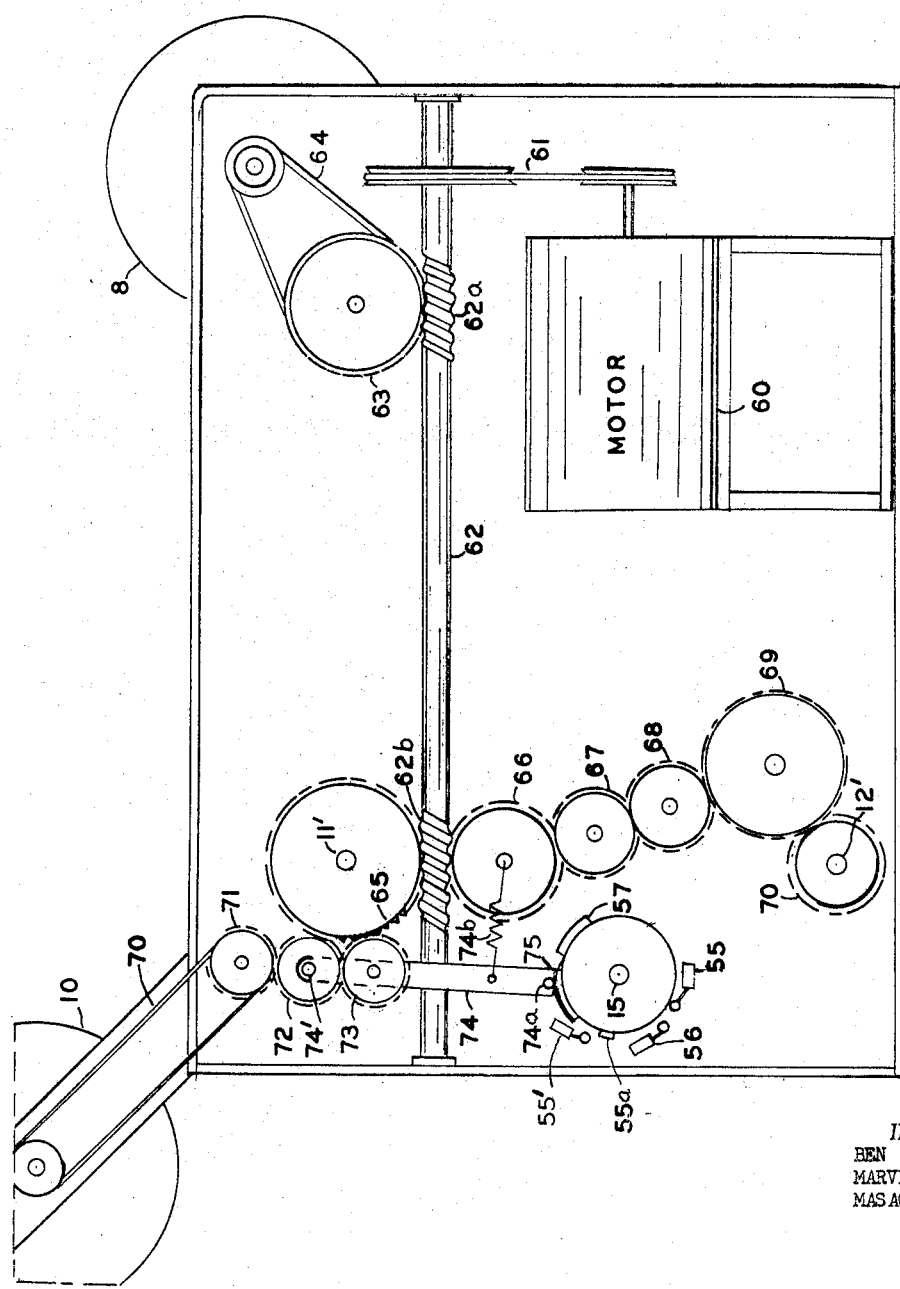

United States Patent Office 3,490,837
Patented Jan. 20, 1970

3,490,837
PROJECTOR WITH FILM THREADING MEANS
Ben Peirez and Marvin Mindell, Great Neck, N.Y., and Masao Komatsu, Tokyo, Japan, assignors to Viewlex, Inc., Holbrook, N.Y.
Filed June 8, 1967, Ser. No. 644,688
Int. Cl. G03b 1/56
U.S. Cl. 352—159        4 Claims

ABSTRACT OF THE DISCLOSURE

A motion picture projector having cover guide means to guide a manually held film into contact with upper and lower sprockets. Thereafter, a single control knob moves the lens assembly with loop forming arms to engage the film. The same control knob moves guide rollers to wrap the film around an optical sound pickup. Magnetic sound pickup means are also provided.

---

This invention relates to sound motion picture projectors and more particularly to means for threading film in the projector. The invention also applies to silent projectors.

Threading motion picture projectors is generally a complicated, tedious operation especially if there is not sufficient light available. If the film is not threaded properly with proper sprocket holes it is likely to be torn or otherwise damaged.

The present invention provides a projector which may be threaded by holding the film in the vertical direction and sliding it into a guide slot between the covers and into an engagement between two sprockets. Thereafter a single control knob is turned which moves a lens assembly with loop forming arms which locates the film at the aperture plate with proper slack loops. At the same time the film is wrapped around the optical sound pickup and also if desired into operative contact with a magnetic pickup.

Accordingly a principal object of the invention is to provide new and improved motion picture projector means.

Another object of the invention is to provide new and improved film threading means for silent or sound motion picture projectors.

Another object of the invention is to provide new and improved motion picture film projection means of the type having optical and magnetic sound pickup.

Another object of the invention is to provide new and improved motion picture projector means whereby the film may be inserted by holding it in a vertical direction and sliding it into a guide slot and into contact with the sprockets and including a single knob control for forming the film loop and providing film engagement with the sound pickup mechanisms.

Another object of the invention is to provide new and improved motion picture projector having a frame, a projection lamp mounted on an optical axis, input and output film spools, aperture plate means defining a film plane perpendicular to said axis, intermittent film moving means mounted on said plate means and an optical sound pickup, means to engage said film comprising input and output sprockets mounted on said frame in fixed position, forward of said sprockets, lens assembly means connected to said sprockets, lens assembly means mounted for movement along said axis, the forward position of said assembly being forward of said sprockets, control means connected to move said lens assembly along said axis, a pair of loop forming arms mounted on said assembly, a pair of cams mounted on said frame and adapted to engage said loop forming arms whereby as said assembly is moved in, a pair of loops are formed in said film one above said axis and one below said axis, said lens assembly having a spring loaded pressure plate adapted to hold said film against said aperture plate when said assembly is in rearward "ON" position.

These and other objects of the invention will be apparent from the following specification and drawings, of which;

FIGURE 1 is a side view of the embodiment of the invention.

FIGURE 1A is a side view of the embodiment of FIGURE 1 with the two film guide covers removed.

FIGURES 2 and 2A and 3 are diagrams illustrating the operation of the invention.

FIGURE 4 is a partial rear view of the embodiment of FIGURE 1 with the back cover removed.

Figure 3:
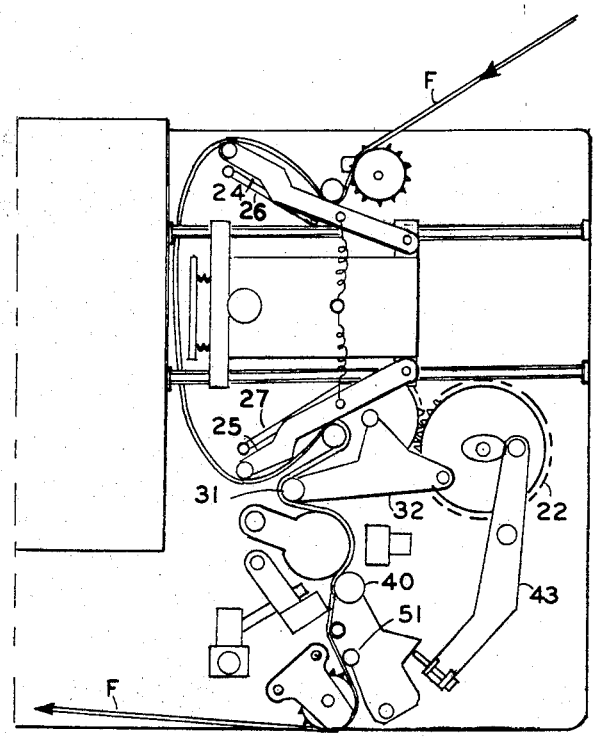

Referring to FIGURES 1 and 1A thre is shown a side view of a motion picture projector having a frame 1 on which are mounted an input reel 10 and an output reel 8. The lamp assembly 7 may be conventional and is adapted to project a beam of light to the front of the projector behind the separate covers 5 and 6.

According to a novel feature of the invention, the film is adapted to be inserted in the guide pocket 5' formed between the covers 5 and 6. At the bottom of the cover 5 is a sprocket 12 and at the top behind the cover 6 is a sprocket 11. The film is then manually held in a vertical position and inserted in the slot 5' into contact with the sprockets as will be explained. The sprockets have spring finger holding means so that once the film is snapped into contact with the sprockets it will be retained there by the spring finger means, as shown in FIGURE 2A.

Thereafter the control knob 15' is rotated clockwise to "Motor" position. This causes the lens assembly 16 to move rearwardly into contact with the lamp projection assembly 7 as will be explained in connection with FIGURE 1A. As the lens assembly is moved rearwardly slack loops are automatically formed above and below the film pressure plate and the film F is also wrapped around the optical sound pickup and/or in contact with the magnetic pickup. The lens assembly has a spring loaded pressure plate which presses the film in engagement with conventional intermittent motion film moving means. Further movement of the knob 15' to the "lamp" position will turn on the projection lamp and the lamp for the optical pickup.

If it is desired to remove the film before running it completely through the projector, the projector is stopped and the spring fingers are released manually thereby releasing the film which may be removed through the slot 5'.

Figure 2:
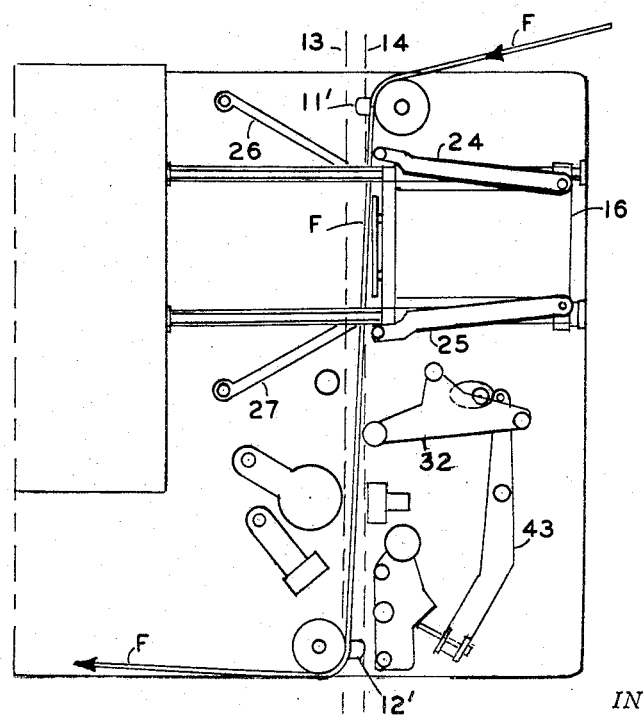

Referring to FIGURES 1A, 2 and 3 there is shown a side elevation view of the mechanism with film guide covers removed. The film F is mounted on the input reel 10. The film is manually inserted and guided by cover guides into contact with the input sprocket 11 and the output sprocket 12. The position of the edges of the cover edges are shown by the dotted lines 13 and 14, FIGURE 2. Therefore, as the film is held in the vertical direction it is guided into contact with the input sprocket 11 and the output sprocket 12. The input and output reels are then manually turned to place a small tension on the film which causes the film to snap between the spring fingers of the sprockets where they will be held by the spring fingers shown in FIGURE 2A. All of this takes place with the single control shaft 15 in "OFF" position. The lens assembly 16 comprises a plastic or metal container which is adapted to ride on the rods 17 and 18. The container 16 has a rack 20 which engages the frame mounted gear 21 which is also connected to the gear 22 which is fixedly connected to the control shaft 15. Therefore when the control shaft is rotated clockwise the lens assembly will be moved in towards the aperture plate 9.

LOOP FORMERS

It is necessary to form loops in the film as shown in FIGURE 1A to accommodate the conventional intermittent motion at the aperture plate. This is done by the loop forming arms 24, 25 which are pivotally mounted on the top and bottom of the lens assembly and which are spirng loaded by the springs 24' and 25'.

As the lens is moved in, to the left in FIGURE 1A, the loop forming arm 24 rides up on the cam 26 which is pivotally mounted on the pin 26' and spring loaded down by spring 26a against stop 26b. The cam 26 is pivotally mounted at a point which permits the roller 24a to drop off the cam when, in full "IN" position, leaving the slack loop. When the lens assembly is again moved to the right then the roller 24a will pass under the cam 26 raising the cam 26 against its spring force. The loop forming arm 25 operates similarly on the cam 27 leaving a slack loop beneath the lens assembly.

The film then passes over a stationary roller 30, and around the roller 31 mounted on arm 32 which is pinned to the gear 22. The arm 32 also has another small roller 33 which mates with the roller 30, when in "IN" position which is shown in FIGURE 1A. The film then passes around the optical pickup drum 35 which is conventional and has a conventional light source 36 and lens 37. The film is wrapped around the drum by means of the rollers 31 and 40. The roller 40 is mounted on an arm 41 which is pivotally mounted on the pin 42. The arm 41 is spring loaded in the clockwise direction by spring 41'. The arm 41 is adapted to the rotated counterclockwise in the "IN" position by means of the lever 43 which is pivotally mounted to the frame by the pin 44 and is activated by the cam 45 and cam follower 43'. The cam 45 is fixedly connected to the control shaft 15. The roller 40 forms a guide for the magnetic pickup 47 which is mounted on the arm 48 which is pivotally mounted to the frame by means of the pin 49.

When it is desired to use the magnetic pickup the arm 48 is rotated counterclockwise by a conventional linkage which is not shown. When the optical system is being used, then the magnetic pickup is rotated clockwise out of the way.

The film then passes by the roller 50 fixedly mounted on the frame and roller 51 mounted on arm 52 which is pivotally mounted on pin 42 and connected to the arm 41 by means of the pin and slot connection 53. The arm 52 is spring loaded in the counterclockwise direction by means of the spring 52'. The film then passes around the lower sprocket 12 and out to the pickup reel.

FIGURES 2, 2A and 3 are diagrams illustrating operation of the invention. In FIGURE 2 the lense assembly 16 is shown in the "OFF" position and the film F is shown in the vertical line defined by the cover guides. Therefore after the lead end of the film has been threaded into the takeup reel, the film is held in a vertical direction and inserted between the cover guides illustrated by the dotted lines 13 and 14 into the machine until the film comes in contact with the spring finger stops 11' and 12' of the sprockets 11 and 12. As shown in FIGURE 2A when the film is first inserted it is held against the stop 11' and the corresponding stop 12'. Then manual tension is placed on film causing the film to snap behind the spring fingers 11a and 11b.

Specifically referring to FIGURE 2A the spring fingers 11a and 11b are mounted on a pair of bolts 9' and 9" and the spring fingers are lightly spring loaded toward each other by a spring 11c. Therefore when tension is placed on the film it forces the spring fingers apart and engages the sprocket where it is held by means of the projecting claws on the spring fingers. The sprocket 12' is similarly arranged.

FIGURE 3 shows the lens assembly part way in. Note that the loop forming arms 24 and 25 are riding up on the cams 26, 27. Note also that the rollers 31, 40, and 51 are moving to the left.

FIGURE 1A shows the apparatus in the "IN" position.

Since it is desired to have a lamp control on the same control shaft, means are provided to have an "IN" position called a "Motor" position and another "IN" position called the "Lamp" position.

In the "Motor" position the lens assembly is fully to left however the arm 32 is not quite as far as it can go.

FIGURE 1A shows "Motor" position. As the control shaft 15 is rotated slightly more clockwise to the "Lamp" position then the arm 32 is elevated causing the roller 31 to come in close contact with the optical drum pickup 35. This movement of the shaft is utilized to switch on the motor, projection lamp, and the optical pickup lamp by motor switch 55, and lamp switch 56, FIG. 4, operated by cam 57 mounted on the control shaft 15.

Referring to FIGURE 4 there is shown the power drive to the sprockets and takeup reels. Power is supplied by the motor 60 which is connected by the means of pulleys and belt 61 to drive the shaft 62 which has a pair of worm gears 62a and 62b. The worm gear 62a meshes with the gear 63 which is connected to drive the takeup reel 8 by means of pulleys or the belt or chain 64.

The sprockets 11 and 12 are driven as follows. The sprocket 11 is driven by means of the gear 65 which meshes with the worm gear 62b. The sprocket 11 is preferably connected to the gear 65 through a clutch, and shaft 11'.

The lower sprocket 12 is driven by means of the gear train comprising the gears 66, 67, 68, 69, and 70. The sprocket 12 preferably connected to the gear 70 through a clutch, and shaft 12'.

In the rewind operation it is necessary to drive the input reel 10. The input reel 10 is driven by means of pulleys and the belt 70 and by means of meshing gears 71, 72, and 73. The gears 72 and 73 are mounted on a lever 74 which is pivotally mounted on a pin 74'. On the other end of the lever 74 is mounted a cam follower 74a which is spring loaded by the spring 74b and which rides on a cam 75, which is spaced on shaft 15 from cam 57.

Therefore, when the control shaft 15 is rotated to "Reverse" position which is the position of the cam 75 shown, then the spring 74b rotates the lever arm 74 counterclockwise causing the gear 73 to mesh with the gear 65 on the sprocket 11 shaft. This drives the input reel in the reverse direction.

REVERSE OPERATION

When the control shaft 15 is in "OFF" position and it is moved counterclockwise to "Reverse" position, it initiates a rewind operation. In this mode of operation the power motor 60 is reversed by means of a switch 55' which is operated by a cam 55a on the control shaft. In the rewinding position the film is vertical in the slot, or it may be removed from the slot and rewound directly from one reel to the other.

The film engagement means is operated as follows:

The control knob is turned to "OFF" position.

The film is first connected to the takeup reel.

The film is then held in the hands in a straight vertical line and manually inserted into the guides provided by the cover portions. The input and output reels are then manually tightened which causes the film to snap past the spring fingers past the sprockets 11 and 12 and engage the sprockets.

The control knob 15' is then turned clockwise which causes the lens assembly to move in towards the aperture plate. The lens assembly is mounted on a pair of rods and is moved by a means of a rack and gear. The rack is mounted on the assembly and is geared to the control shaft. As the lens assembly is moved in, the loop forming arms ride up on fixed cams to form loops above and below the aperture plate assembly. When the lens assembly is all the way in, the arms slide the intermittent film motion at the projection aperture.

At the same time that the assembly is moved in, a roller 31 comes in and wraps the film around the optical sound pickup 35. This roller is mounted on a spring loaded arm 32 which is pinned to a gear 22 connected to the control shaft 15. The gear 22 on the control shaft does not have teeth all the way around so that after the lens assembly is in "Motor" position the control arm 32 can still move further and this motion is used to rock the roller 31 into contact with the upper portion of the optical sound pickup. The arm of roller 31 also has a second roller 32 which in the "IN" position is adjacent to the stationary roller 30.

At the same time as the assembly moves in a roller 40 wraps the film around the underside of the optical sound pickup 35. This roller is mounted on an arm 41 which is pivotally mounted to the frame by pin 42.

The magnetic pickup 47 is pivotally mounted on an arm 48 which is adapted to be rotated by a push button lever arrangement 48'. When magnetic pickup is in operative relation it rests against the magnetic sound track on the film.

The sprockets are preferably driven through one way clutches the input of which is geared to power motor 60. The input and output reels are also geared or belt connected to the power drive shaft, in conventional manner for forward and reverse takeup operation.

Many modifications may be made by those who desire to practice the invention without departing from the scope thereof which is defined by the following claims.

We claim:

1. In a motion picture projector having a frame, a projection lamp mounted on an optical axis, input and output film spools, aperture plate means defining a film plane perpendicular to said axis, and intermittent film moving means mounted on said plate means;

means to engage said film comprising input and output sprockets mounted on said frame in fixed position, forward of said film plane, spring loaded film holding means connected to said sprockets, lens assembly means mounted for movement along said axis, the forward position of said assembly being forward of said sprocket, control means connected to move said lens assembly along said axis, a pair of loop forming arms mounted on said assembly, a pair of cams mounted on said frame and adapted to engage said loop forming arms whereby as said assembly is moved in, a pair of loops are formed in said film one above said axis and one below said axis, said lens assembly having a spring loaded pressure plate adapted to hold said film against said aperture plate when said assembly is in rearward "IN" position.

2. Apparatus as in claim 1 wherein said projector has an optical sound pickup and means connected to said control means to wrap said film around said optical pickup.

3. Apparatus as in claim 1 wherein said projector has a magnetic sound pickup said magnetic pickup means movably mounted and means to move said magnetic pickup means into operative contact into said film.

4. Apparatus as in claim 3 having said cover means adapted to form a guide for manually inserting film into contact into said input and output sprocket means.

References Cited

UNITED STATES PATENTS

| | | |
|---|---|---|
| 2,000,286 | 5/1935 | Howell. |
| 2,142,493 | 1/1939 | Carpenter _____ 352—159 |
| 3,137,201 | 6/1964 | Uterhart _____ 352—158 |
| 3,180,546 | 4/1965 | Wessner. |

JULIA E. COINER, Primary Examiner

U.S. Cl. X.R.

352—157